Dec. 2, 1924.                                                                     1,517,782
B. L. HARPER
AUTOMATIC TIRE PUMP
Filed Feb. 1, 1922          3 Sheets-Sheet 1
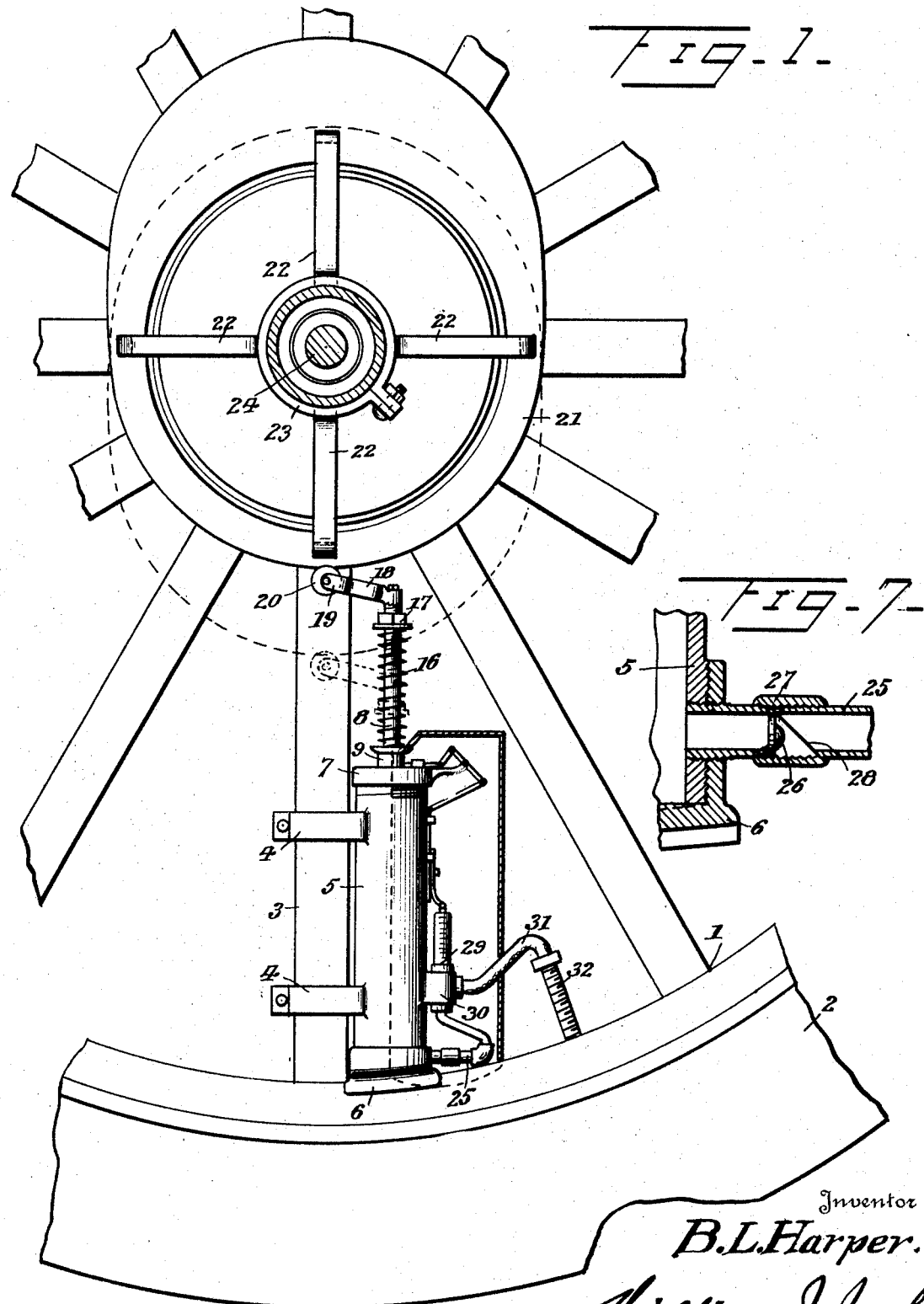
Inventor
B.L.Harper.
By William J. Jacobi
Attorney Dec. 2, 1924.
B. L. HARPER
AUTOMATIC TIRE PUMP
1,517,782
Filed Feb. 1, 1922    3 Sheets-Sheet 2
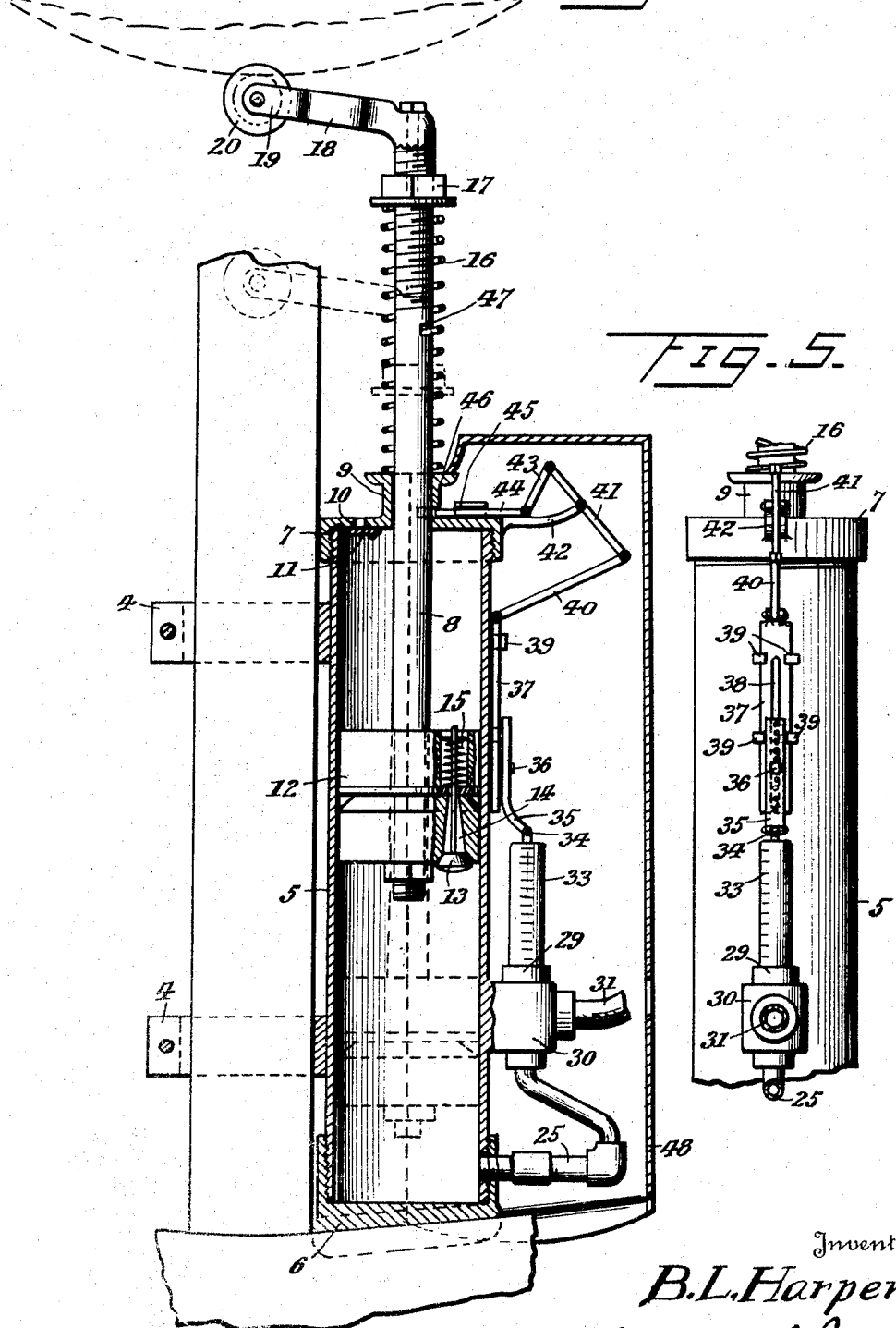
Inventor
B. L. Harper
By William J. Jacobi
Attorney

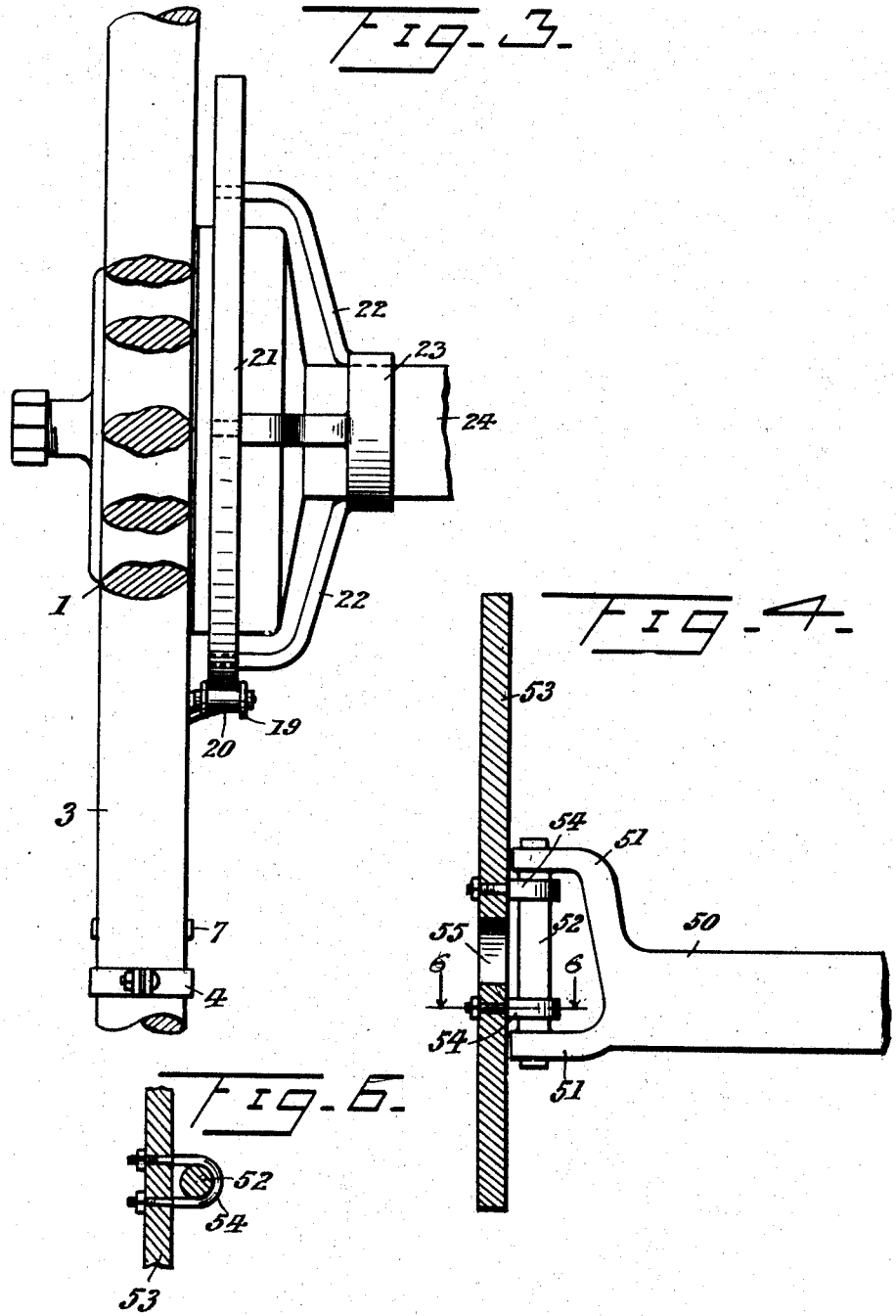

Patented Dec. 2, 1924.

1,517,782

UNITED STATES PATENT OFFICE.

BARNIE L. HARPER, OF RINEYVILLE, KENTUCKY.

AUTOMATIC TIRE PUMP.

Application filed February 1, 1922. Serial No. 533,192.

*To all whom it may concern:*

Be it known that BARNIE L. HARPER, a citizen of the United States, residing at Rineyville, in the county of Hardin and State of Kentucky, has invented certain new and useful Improvements in Automatic Tire Pumps, of which the following is a specification.

This invention has relation to certain new and useful improvements in an automatic tire pump and has for its primary object the provision of a pump of the character which may be mounted upon a wheel and operated automatically to pump air into the tire on the wheel and retain the pressure within the tire at a predetermined degree during operation of the wheel.

The invention has for another object the provision of an automatic tire pump of the character stated which will be of simple and comparatively inexpensive construction as well as highly efficient in use and which may be mounted on the wheel to be operated during rotation of the wheel by a stationary cam carried on the axle, adjacent the wheel.

The invention has for a further object the provision of an automatic tire pump of the character stated which will be constructed in such a manner that the pump will be operated automatically when the pressure in the tire decreases below a predetermined point and will be automatically stopped after the pressure has been increased in the tire above a predetermined degree, thereby making it possible to retain the desired degree of pressure within the tire during operation of the wheel.

The invention has for a further object the provision of an automatic tire pump of the character set forth which will be of such construction that all of the operative parts may be enclosed in a casing and a piston of the pump will be locked against operation when it is not desired to force more compressed air into the tire, the pump piston being automatically released for operation when there is a decrease of the pressure within the tire below a predetermined degree.

A still further object of the invention resides in the provision of an automatic tire pump of the character stated which may be readily mounted upon a wheel and axle or removed therefrom without expensive alterations in the construction of the wheel or axle.

The invention has for a still further object the provision of an automatic tire pump of the character set forth which will be of such construction that the parts thereof may be readily assembled or disassembled and any of the parts may be readily repaired or replaced without the necessity of providing an entire new pump.

With the foregoing and other objects in view as will appear as the description proceeds, the invention consists in the novel construction, combination and arrangement of cooperating elements as hereinafter more specifically set forth, claimed and shown in the accompanying drawings forming a part of the present application and in which:—

Figure 1 is an elevation of a wheel and a portion of the axle therefor with my invention in operative position.

Figure 2 is a detailed sectional view on an enlarged scale through the pump structure as shown in Fig. 1 of the drawings and also including a portion of the wheel and the operating cam in elevation.

Figure 3 is a section through a portion of the wheel so as to show in elevation the mounting of the operating cam on the axle of this wheel, this mounting referring particularly to the rear wheel and axle.

Figure 4 is a detail elevation of the end of a front axle and showing the preferred manner of mounting the operating cam on this axle, the operating cam being shown in section in this view.

Figure 5 is an elevation of a portion of the pump structure, showing the gauge member and the connections of the same with the piston locking mechanism.

Figure 6 is a detail sectional view on the plane of line 6—6 of Fig. 4, looking in the direction indicated by the arrows.

Fig. 7 is a sectional view of the valved outlet.

Referring more in detail to the drawings in which similar reference characters designate corresponding parts throughout the several views, 1 indicates in general a wheel of a motor vehicle or the like and carrying the pneumatic tire 2 which may be inflated by the automatic pump, as will be later described in detail. The pump is secured to one of the spokes 3 of the wheel 1 by suitable clamping members 4, as shown clearly in Figs. 1 and 2 of the drawings. These clamping members 4 are illustrated as being carried by the pump cylinder 5 having the removable end caps 6 threaded on one end and resting against the felly of the wheel 1, while the opposite end of the pump cylinder 5 is closed by an end cap 7 threaded thereon and through which the piston rod 8 of the pump is adapted to reciprocate, said cap 7 having a suitable extended guide flange 9 for the piston rod 8, as shown clearly in Fig. 2 of the drawings. The cap 7 has a suitable valve opening or air inlet port 10 with a valve 11 for normally closing the same from the inner side of the pump cylinder 5. This valve 11 may be of the flap valve type or any other suitable type. A piston 12 is mounted on the inner end of the piston rod 8 and this piston may be of any suitable type, including a spring seated valve 13 for closing the valve passage 14 through the piston 12. A spring 15 or the like is employed for normally seating the valve 13, as shown in Fig. 2 of the drawings. The piston 12 and piston rod 8 are normally forced outwardly by the spring 15 engaged around a portion of the piston rod 8 outwardly of the cap 7 and having one end bearing against the flared outer end of the guide flange 9 while its opposite end bears against the adjustable stop nut 17 threaded on the piston rod 8. This will permit of adjustment of the tension of the spring 16. An arm 18 is mounted on the outer extremity of the piston rod 8 and carries in its bifurcated free end 19 the roller 20 which is adapted, when the piston rod 8 is extended and permitted to be operated, to ride upon the stationary cam member 21. This cam member 21 is supported adjacent and parallel with the wheel 1 by the supporting arms 22 projecting radially on the sleeve 23, which latter is in the form of a clamping sleeve removably secured upon the axle 24. As the wheel 1 rotates around the axle 24, the roller 20 rides upon the periphery of the cam member 21 and thereby forces the piston rod 8 and piston 12 inwardly, the spring 16 serving to again force these members outwardly and thereby provide for a complete working stroke and return stroke of the piston 12 on each rotation of the wheel 1. It is evident that on each inward or working stroke of the piston 12, the air will be drawn into the pump cylinder 5 by way of the inlet port 10. On the return or opposite stroke of the piston 12 the valve 11 closes the intake port 10 and the valve 13 of the piston 12 will open, permitting the air to pass through the passage 14 of the piston 12 to the other end of the cylinder. The next inward or working stroke of the piston 12 as well as drawing in a new supply of air by way of the port 10 will close the valve 13 and cause a compression of the air in the end of the cylinder towards which the piston 12 is moving. This compressed air is forced out of the cylinder 5 by way of the air conducting pipe 25 having the one way valve 26 located therein to prevent return of the compressed air to the cylinder. This valve 26 is located at a connection of sections of the pipe 25 and which sections are connected by the connecting sleeve 27, as shown clearly in Fig. 7 of the drawings. One end of one of the sections of the pipe 25 has a portion cut away, as shown at 28 so as to provide sufficient space for operation of the valve 26, which may be readily seen as secured between the sections of the pipe 25 within the sleeve 27 in any suitable and well known manner. The pipe 25 connects directly to a gauge 29 mounted in a suitable manner on the outer face of the pump cylinder 5, as shown at 30. A flexible pipe 31 extends from the gauge member 29 for attachment with the tire valve 32 in a suitable manner so as to direct compressed air to the tire tube from the gauge member 29. It is therefore evident that the gauge 29 must be operated by the compressed air supplied for the tire tube and all of this compressed air must pass through the air gauge 29 on its way to the tire tube. It is also evident that the pressure gauge 29 will indicate at all times the pressure within the tire tube.

In order to provide means for automatically arresting operation of the pump at the proper time, the movable member 33 of the pressure gauge 29 has one or more ears 34 projecting from one end and upon which is pivotally mounted one end of a slidable bar 35 having suitable graduation marks on one face. The slide bar 35 is adapted to be connected by a suitable pivot member 36 with a second slide bar 37 by engagement of the pivot member 36 in the proper opening in the slide bar 35, this slide bar being provided with a plurality of openings along its graduated face. The slide bar 37 is provided with an elongated longitudinal groove 38 within which the pivot member 36 may be adjusted. Suitable guide members 39 are mounted on the face of the pump cylinder 5 and extend over the longitudinal edges of the slide bar 37 so as to carry this bar and the slide bar 35 longitudinally upon the pump cylinder 5. A bar 40 is pivoted at one end to the free end of the slide bar 37 and this rod 40 has its opposite end pivoted to a rock arm 41, which latter is pivoted intermediate its ends upon a supporting bracket arm 42 projecting from the cap 7 of the pump cylinder 5. A comparatively short rod 43 is pivoted upon the remaining end of the rod 41 and also pivotally connected with the sliding locking bolt 44 working upon the upper face of the cap 7. This sliding locking bar 44 is adapted for sliding movement in the guide member 45 also mounted on the upper or outer face of the cap 7 and the working end of the bolt 44 is adapted to work through an opening 46 in the upstanding flange 9 of the cap 7 so as to enter the slot or recess 47 in the side of the pump piston rod 8 when this slot or recess 47 is brought to proper position and the bolt 44 forced into the same. It is evident that this may occur when the movable member 33 of the pressure gauge 29 is forced outwardly by an abnormal increase of the air pressure, thereby forcing outwardly or upwardly the slide rods 37 and 35 to operate the bar 40, arms 41 and 43 and force the sliding locking bolt 44 toward the piston rod 8, so as to enter the slot or recess 47 as the plunger rod 8 and plunger 12 again move inwardly. This will lock the pump against further operation until the pressure again decreases, thereby permitting a reverse movement of the slide bars 35 and 37 and the rods controlled thereby, withdrawing the sliding locking bolt 44 and releasing the piston rod 8 so as to permit the roller 20 to again ride upon the periphery of the cam member 21 and thereby cause operation of the pump to be resumed as the wheel 1 rotates. In order to enclose and protect the operative parts of the invention mounted on the pump casing 5, I have provided a protecting casing 48, projecting from and suitably connected with the pump casing 5 which will be readily seen by referring to Figs. 1 and 2 of the drawings. This casing 48 may be provided with an opening 49 through which the tube 31 may be extended, as shown in the drawings.

In Figs. 4 and 6 of the drawings it is clearly illustrated how the invention may be applied to the forward axle for the forward wheels of a motor vehicle or the like. The forward axle 50 is usually provided at its opposite ends with a bifurcated portion providing parallel arms 51, supporting a vertical pin 52 of the gearing mechanism. A cam disc 53 may be secured to the pin 51 by suitable clamping members 54 extended therearound and secured in a suitable manner to the cam disc 53, as shown clearly in Figs. 4 and 6. The cam disc 53 is shown as having an opening 55 within which the spindle of the wheel, not shown in these views may be extended in a suitable manner to permit of the proper and free rotation of the wheel, as will be clearly understood by parties familiar with this art.

It is believed that the complete construction and operation of this invention may now be readily understood from the foregoing paragraphs without further detailed description. It may be briefly stated however, that the pump will be automatically operated whenever the pressure within the tire 2 decreases below a predetermined degree and will continue its operation during rotation of the wheel 1 until the pressure within the tire 2 has decreased to the desired degree, at which time the pressure gauge 29 will operate as previously stated to cause an automatic engagement of the sliding lock bolt 44 in the slot or recess 47 of the pump piston rod 8 to retain this piston rod 8 of the piston 12 in its inwardmost position. The piston rod 8 and piston 12 will be held in this position until the pressure in the tire 2 again decreases sufficiently to cause the pressure gauge 29 to operate and release the sliding lock bolt 44 from the slot or recess 47 in the pump piston rod 8. As soon as the pump piston rod 8 is released the spring 16 will act to return the same to its outermost or normal position and thereby retain the roller 20 in engagement with the cam member 21 so as to cause the proper operation of the pump upon rotation of the wheel 1. This automatic stopping and releasing of the pump piston 12 and piston rod 8 will continue during rotation of the wheel 1 without the attention of the chauffeur or without any mechanical or manual operation of any part of the device. It is believed the complete operation may now be clear without further description.

While the preferred embodiment of the invention has been shown and described, it is to be understood that minor changes in the details of construction and arrangement of parts may be resorted to within the scope of what is claimed without departing from the spirit of the invention.

What I claim is:—

1. In combination, a pump including a cylinder and a piston rod reciprocating therein, a compressed air conducting pipe extending from said pump to a pneumatic tire, a pressure gauge mounted on said pipe, locking means associated with the movable member of said gauge for holding said pump in an inoperative position upon an undue increase of pressure in said tire, said locking means comprising a bar connected to the free end of said movable member and slidably mounted on said cylinder, a bolt slidably mounted on the upper face of said pump and adapted to engage a slot in said piston rod, and connecting means between said slidable bar and said slidable bolt for actuating the latter.

2. In combination, a pump including a cylinder, a piston and a piston rod reciprocating therein, a compressed air conducting pipe extending from said pump to a pneumatic tire, a regulator associated with said pump, said regulator comprising a pressure gauge mounted on said pipe, locking means associated with the movable member of said gauge for holding said pump in an inoperative position upon an undue increase of pressure in said tire, said locking means comprising a slidable bar connected to the upper end of said movable member, a second slidable bar adjustably connected to said first mentioned slidable bar, a bolt slidably mounted on the upper face of said pump and adapted to engage a cut-out portion provided in said piston rod, interconnected rods associated with said slidable bars, and bolt for actuating the latter.

3. In combination, a pump including a cylinder, a piston and a piston rod reciprocating therein, a compressed air conducting pipe extending from said pump to a pneumatic tire, a regulator associated with said pump, said regulator comprising a pressure gauge mounted on said pipe, locking means associated with the movable member of said gauge for holding said pump in an inoperative position upon an undue increase of pressure in said tire, said locking means comprising a slidable bar connected to the upper end of said movable member, a second slidable bar adjustably connected to said first mentioned slidable bar, guide means therefor, a bracket mounted on the upper end of said cylinder, a rocker arm pivotally mounted intermediate its end on the outer end of said bracket, a rod connecting one end of said rocker arm with the upper end of said second mentioned slidable bar, and a bolt slidably mounted on the upper face of said cylinder connected to the opposite end of said rocker arm, said slidable bolt adapted to engage a cut-out portion provided in said piston rod.

4. In combination, a pump including a cylinder, a piston and a piston rod reciprocating therein, a compressed air conducting pipe extending from said pump to a pneumatic tire, a regulator associated with said pump, said regulator comprising a pressure gauge mounted on said pipe, locking means cooperating with the movable member of said gauge for holding said pump in an inoperative position upon an undue increase of pressure in said tire, said locking means comprising a slidable bar arranged on the outer periphery of said cylinder and connected with the movable member of said gauge, guide means for said slidable bar, a bracket secured to the upper end of said cylinder and projecting outwardly therefrom, a rocker arm fulcrumed intermediate of its ends and the outer end of said bracket, a link member pivoted at its ends respectively to one end of said rocker arm and to the upper end of said slidable bar, a slidable bolt arranged on the upper face of said cylinder, guide means for said last mentioned bolt, and a link pivotally connected at its ends respectively to the opposite end of said rocker arm and the outer end of said last mentioned sliding bolt, said last mentioned bolt being adapted to engage a cut-out portion in said piston rod, as and for the purpose described.

In testimony whereof I affix my signature.

BARNIE L. HARPER.